(12) United States Patent
Palmeri et al.

(10) Patent No.: US 11,327,163 B2
(45) Date of Patent: May 10, 2022

(54) METHODS, SYSTEMS AND COMPUTER PROGRAM PRODUCTS FOR CONSTRUCTIVE SHEAR WAVE ULTRASOUND IMAGING

(71) Applicant: Duke University, Durham, NC (US)

(72) Inventors: Mark Palmeri, Durham, NC (US); Kathryn R. Nightingale, Durham, NC (US)

(73) Assignee: Duke University, Durham, NC (US)

( * ) Notice: Subject to any disclaimer, the term of this patent is extended or adjusted under 35 U.S.C. 154(b) by 345 days.

(21) Appl. No.: 16/076,379

(22) PCT Filed: Apr. 21, 2016

(86) PCT No.: PCT/US2016/028622
§ 371 (c)(1),
(2) Date: Aug. 8, 2018

(87) PCT Pub. No.: WO2017/184142
PCT Pub. Date: Oct. 26, 2017

(65) Prior Publication Data
US 2019/0041506 A1 Feb. 7, 2019

(51) Int. Cl.
*G01S 7/52* (2006.01)
*G01S 15/89* (2006.01)

(52) U.S. Cl.
CPC ...... *G01S 7/52042* (2013.01); *G01S 7/52026* (2013.01); *G01S 7/52036* (2013.01);
(Continued)

(58) Field of Classification Search
CPC .............. G01S 15/8915; G01S 15/8922; G01S 15/8927; G01S 7/52026; G01S 7/52036; G01S 7/52042; G01S 7/52085
See application file for complete search history.

(56) References Cited

U.S. PATENT DOCUMENTS

| | | |
|---|---|---|
| 2004/0068184 A1 | 4/2004 | Trahey et al. |
| 2012/0136250 A1 | 5/2012 | Tabaru et al. |

(Continued)

FOREIGN PATENT DOCUMENTS

| | | |
|---|---|---|
| WO | 20110138722 | 11/2011 |
| WO | 20120116364 | 8/2012 |

OTHER PUBLICATIONS

Hollender, Peter J., et al., "Single- and Multiple-Track-Locatin Shear Wave and Acoustic Radiation Force Impulse Imaging: Matched Comparison of Contrast-to-Noise Ratio and Resolution", Ultrasound in Medicine and Biology, vol. 41, No. 4, Apr. 1, 2015, pp. 1043-1057.

(Continued)

*Primary Examiner* — Pascal M Bui Pho
*Assistant Examiner* — Alexei Bykhovski
(74) *Attorney, Agent, or Firm* — Myers Bigel, P.A.

(57) ABSTRACT

Methods, systems and computer program products for determining a mechanical parameter for a sample having a target region using constructive shear wave displacement is provided. The method includes generating a first shear wave in the target region at a first excitation position and a second shear wave in the target region at a second excitation position; transmitting tracking pulses in the target region at a tracking position that is between the first and second excitation positions; receiving corresponding echo signals for the tracking pulses at the tracking position in the target region; and determining at least one mechanical parameter of the target region based on at least one parameter of a constructive shear wave displacement from the first and second shear waves simultaneously displacing tissue at the tracking position.

20 Claims, 6 Drawing Sheets

(52) U.S. Cl.
CPC ...... *G01S 7/52085* (2013.01); *G01S 15/8927* (2013.01); *G01S 15/8915* (2013.01); *G01S 15/8922* (2013.01)

(56) References Cited

U.S. PATENT DOCUMENTS

| | | | |
|---|---|---|---|
| 2013/0237820 A1* | 9/2013 | Vappou | A61B 8/0858 |
| | | | 600/438 |
| 2015/0305717 A1* | 10/2015 | Hollender | A61B 8/4494 |
| | | | 600/438 |
| 2016/0030005 A1* | 2/2016 | Kulakowski, Jr. | A61B 8/4455 |
| | | | 600/438 |
| 2016/0192906 A1* | 7/2016 | Lee | A61B 8/5207 |
| | | | 600/438 |
| 2018/0068155 A1* | 3/2018 | Call | A61B 8/06 |

OTHER PUBLICATIONS

International Search Report and Written Opinion for PCT/US2016/028622 dated Dec. 7, 2016, 16 pages.

* cited by examiner

METHODS, SYSTEMS AND COMPUTER PROGRAM PRODUCTS FOR CONSTRUCTIVE SHEAR WAVE ULTRASOUND IMAGING

STATEMENT OF GOVERNMENT SUPPORT

This invention was made with government support under Grant No. 1 ROI CA-142824-01 awarded by the National Institutes of Health. The government has certain rights in the invention.

RELATED APPLICATIONS

This application is a 35 U.S.C. § 371 national stage application of PCT International Application No. PCT/US2016/028622, filed Apr. 21, 2016 the disclosure of which is hereby incorporated by reference in its entirety.

FIELD OF THE INVENTION

The present invention relates to ultrasound imaging and analysis, and in particular, to determining mechanical parameters of a sample from constructive arrival times in shear wave ultrasound imaging.

BACKGROUND

Acoustic Radiation Force (ARF) shear wave elasticity imaging methods typically use a transverse propagation velocity of mechanical shear waves in materials to estimate mechanical properties of a sample, such as material elasticity constants. These techniques may be adapted into imaging systems to compute the local shear wave propagation velocity as a function of both axial and lateral position. The velocity may be calculated by estimating the differences in arrival times of the shear waves, either at different recording locations or from different excitation locations.

For example, acoustic radiation force (ARF) arises from a transfer of momentum from a sound wave to the medium through which it is traveling due to both absorption and scattering of the wave and is described by K. R. Nightingale, M. Palmeri, R. Nightingale, and G. Trahey, "On the feasibility of remote palpation using acoustic radiation force," J Acoust Soc Am, vol. 110, pp. 625-634, 2001 and G. R. Torr, "The Acoustic Radiation Force," Am. J. Phys., vol. 52, pp. 402-408, 1984.

$$\vec{F} = \frac{2\alpha \vec{I}}{c} \quad (1)$$

where $\alpha$ is the acoustic attenuation, I is the acoustic intensity, c is the speed of sound, and F is the force applied to the medium. Ultrasonic Shear Wave Elasticity Imaging (SWEI) utilizes this acoustic radiation force by applying ultrasonic pushing pulses that displace the tissue on the order of microns and tracking the propagation of the transverse wave that propagates away from the region of excitation.

SWEI is currently used to characterize the stiffness of tissues, including liver fibrosis. Initial implementations of SWEI involved using sparse displacement fields in inverted wave equation solutions, or time-of-flight algorithms, in which shear wave arrival times are estimated at multiple spatial locations with an assumed direction of propagation. See M. L. Palmeri, M. H. Wang, J. J. Dahl, K. D. Frinkley, K. R. Nightingale, and L. Zhai "Quantifying Hepatic Shear Modulus In Vivo Using Acoustic Radiation Force. Accept. UMB, 34(4):546-558 (April 2008). Additional improvements to SWEI include using multiple shear wave sources that can create a unique shear wave morphology that can be tracked at a single location using correlation-based methods, with the benefit of reduced shear wave speed estimation variance. See U.S. Pat. No. 8,225,666 and U.S. Patent Publication No. 2011/0184,287, the disclosures of which are hereby incorporated by reference in their entireties.

Currently used SWEI techniques that utilize acoustic radiation force to generate shear waves typically require diagnostic ultrasound arrays to generate and track shear waves, with significant signal processing overhead to calculate shear wave arrival times and to estimate shear wave speeds.

SUMMARY OF EMBODIMENTS OF THE INVENTION

In some embodiments, a method for determining a mechanical parameter for a sample having a target region using constructive shear wave displacement is provided. The method includes generating a first shear wave in the target region at a first excitation position and a second shear wave in the target region at a second excitation position; transmitting tracking pulses in the target region at a tracking position that is between the first and second excitation positions; receiving corresponding echo signals for the tracking pulses at the tracking position in the target region; and determining at least one mechanical parameter of the target region based on at least one parameter of a constructive shear wave displacement from the first and second shear waves simultaneously displacing tissue at the tracking position.

In some embodiments, the at least one parameter of the constructive shear wave displacement comprises at least one of a time of a peak displacement of tissue, an inflection in a displacement slope of tissue displacement at the tracking position and a relative or absolute displacement amplitude of the constructive shear wave displacement from the first and second shear waves.

In some embodiments, the tracking position is substantially equidistant from the first and second displacement positions such that the first and second shear waves arrive at the tracking position to create the constructive shear wave displacement at substantially a same arrival time that increases a tissue displacement at the tracking position at the arrival time as compared to a displacement of the first shear wave in an absence of the second shear wave or a displacement of the second shear wave in an absence of the first shear wave.

In some embodiments, generating a first shear wave at a first displacement position and a second shear wave in the target region at a second displacement position comprises generating three or more shear waves at three or more displacement positions, wherein the three or more displacement positions are substantially equidistant from the tracking position.

In some embodiments, determining at least one mechanical parameter of the target region is based on analyzing echo signals at the tracking position to determine a time-of-flight difference and/or velocity estimate of the shear wave.

In some embodiments, the first and second displacement positions correspond to positions of ultrasound array elements that transmit a displacement pulse sufficient to generate a shear wave in the region of interest.

In some embodiments, the tracking position corresponds to a position of an ultrasound array element that transmits the tracking pulses and receives the echo signals.

In some embodiments, the at least one mechanical parameter includes at least one of shear elasticity modulus, Young's modulus, storage modulus dynamic shear viscosity, shear wave velocity and mechanical impedance of the target region.

In some embodiments, the target region comprises an in vivo human tissue sample.

In some embodiments, the target region comprises in vitro biomaterials.

In some embodiments, the echo signals of the sample are detected with an internally inserted ultrasound probe array.

In some embodiments, the echo signals of the sample are detected with an externally applied ultrasound array.

In some embodiments, the first and second shear waves are generated with an applied shear wave source comprising an ultrasound transducer and/or mechanical vibrator.

In some embodiments, the first and second shear waves comprise a displacement that is orthogonal to a direction of the first and second shear waves.

According to some embodiments, A computer program product for determining a mechanical parameter for a sample having a target region using constructive shear wave displacement is provided. The computer program product includes a non-transient computer readable medium having computer readable program code embodied therein. The computer readable program code includes: computer readable program code configured to generate a first shear wave in the target region at a first excitation position and a second shear wave in the target region at a second excitation position; computer readable program code configured to transmit tracking pulses in the target region at a tracking position that is between the first and second excitation positions; computer readable program code configured to receive corresponding echo signals for the tracking pulses at the tracking position in the target region; and computer readable program code configured to determine at least one mechanical parameter of the target region based on at least one parameter of a constructive shear wave displacement from the first and second shear waves simultaneously displacing tissue at the tracking position.

According to some embodiments, an ultrasound system for determining a mechanical parameter for a sample having a target region using constructive shear wave displacement is provided. The ultrasound system includes an ultrasound transducer array and a controller configured to control the ultrasound transducer array. The controller includes: a shear wave generator configured to generate a first shear wave in the target region at a first excitation position and a second shear wave in the target region at a second excitation position; and a signal analyzer configured to transmit tracking pulses in the target region at a tracking position that is between the first and second excitation positions and to receive corresponding echo signals for the tracking pulses at the tracking position in the target region, and to determine at least one mechanical parameter of the target region based on at least one parameter of a constructive shear wave displacement from the first and second shear waves simultaneously displacing tissue at the tracking position.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. For example, the term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Embodiments according to the present invention are described herein with reference to the term "tissue." It will be understood that the term tissue can include biological materials, such as, blood, organs, vessels, and other biological objects found in a body. It will be further understood that embodiments according to the present invention may be applicable to humans as well as other species. Embodiments according to the present invention may also be utilized to image objects other than tissue.

It will be understood that the scope of the present invention includes, for example, two dimensional (2D) ultrasound imaging and 3D (or volumetric) ultrasound imaging. In addition, the components of the ultrasound imaging described herein may be packaged as a single unit or packaged separately and interconnected to provide the functions described herein.

Embodiments according to the present invention are also described by reference to Acoustic Radiation Force Imaging (ARFI) which is described in greater detail, for example, in U.S. Pat. No. 6,371,912, the entire disclosure of which is incorporated herein by reference. An acoustic radiation force may be used to apply a force to tissue thereby causing the tissue to move in the direction of the force and/or to generate a shear wave.

As used herein, a "shear wave" is a form of sample displacement in which a shear wave source, such as ultrasound energy, is transmitted into the sample in one direction and generates an extended shear wave the propagates in another direction that is substantially orthogonal to the direction of the shear wave source. The displacement caused by a shear wave source may be in a range between about 0.1 µm and about 300 µm. Other displacements can be provided.

The term "time of arrival" refers herein to the measured elapsed time between the transmission of a transmitting signal and the return of a corresponding reflected signal. The time of arrival is measured by conventional measurement techniques.

Figure 1:
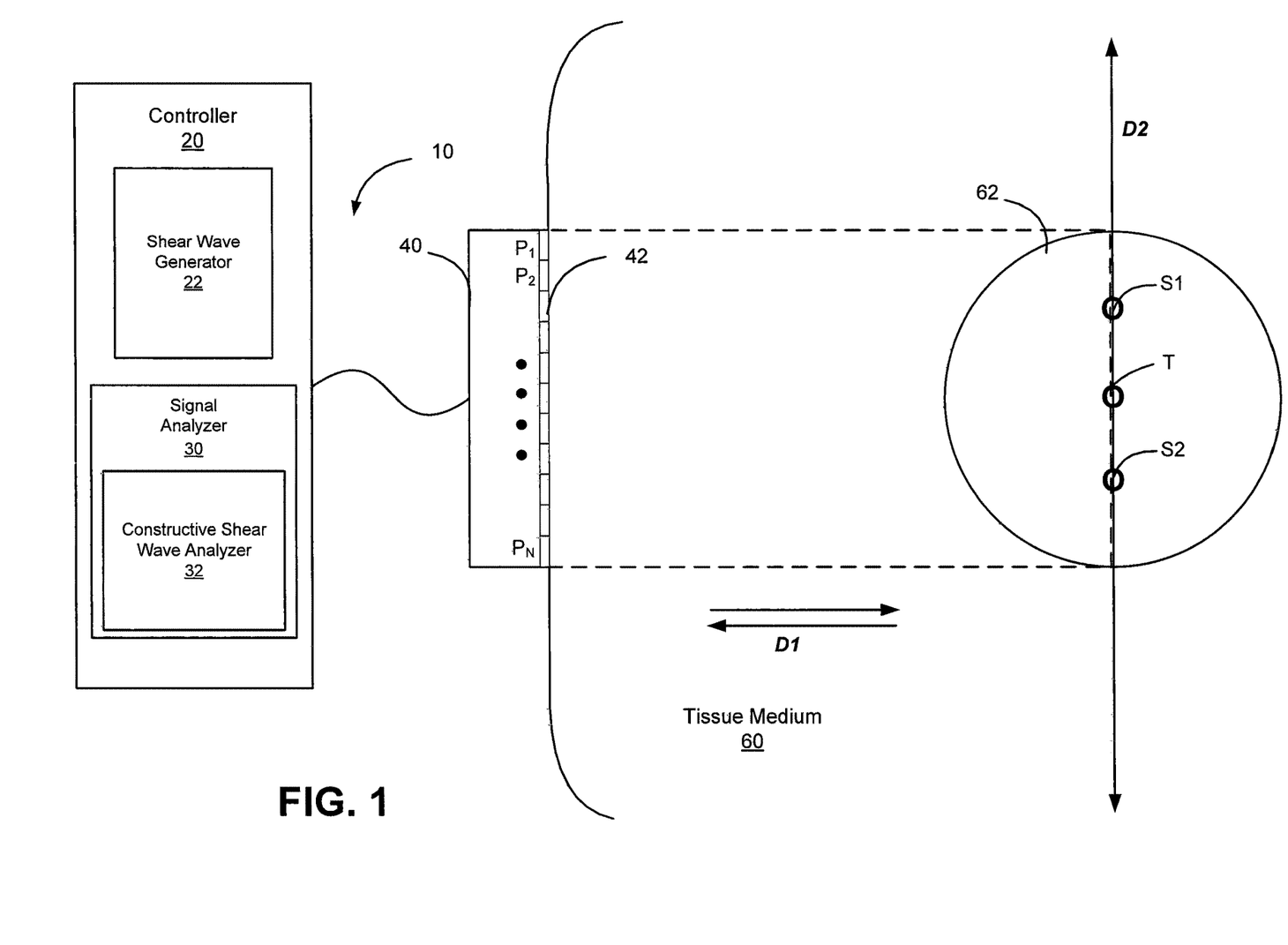
FIG. 1 is a schematic diagram of ultrasound systems, methods and computer program products according to some embodiments.

As illustrated in FIG. 1, an ultrasound system 10 includes a controller 20, a signal analyzer 30 and an ultrasound transducer array 40. The ultrasound transducer array 40 may include a plurality of array elements 42 at positions $P_1$ through $P_N$. The array elements 42 are configured to transmit and receive ultrasound signals 50, and may be contacted to a target medium such as a tissue medium 60. As illustrated, the tissue medium 60 includes a target region 62. The ultrasound array 40 may include ultrasound array elements 42 that define transmit/receive locations for transmitting and receiving ultrasound signals along a direction D1. In some embodiments, the array 40 may be configured to transmit sufficient ultrasound energy, for example, by applying an impulse excitation acoustic radiation force to the medium 60, to generate a shear wave that propagates in a direction D2 that is orthogonal to D1. The array 40 may also be configured to interrogate the tissue medium 60, for example, using ARFI or B-mode imaging techniques to monitor the tissue through time before and/or after the shear wave excitation force has been applied. ARFI imaging is discussed in U.S. Pat. Nos. 6,371,912; 6,951,544 and 6,764,448, the disclosures of which are hereby incorporated by reference in their entireties. Shear waves are discussed in U.S. Pat. Nos. 8,118,744 and 6,764,448, the disclosures of which are hereby incorporated by reference in their entireties. The ultrasound transducer array 40 may be a one-dimensional array configured to generate two-dimensional images or the ultrasound transducer array 40 may be a two-dimensional array configured to generate three-dimensional images.

The controller 20 may include a shear wave generator 22 and the signal analyzer 30 may include a constructive shear wave analyzer 32. The shear wave generator 22 and the constructive shear wave analyzer 32 may be configured to control the array 40 and/or to analyze echo signals received by the array 40 as described herein. The shear wave generator 22 and the constructive shear wave analyzer 32 may include hardware, such as control and/or analyzing circuits, and/or software stored on a non-transient computer readable medium for carrying out operations described herein.

Figure 2:
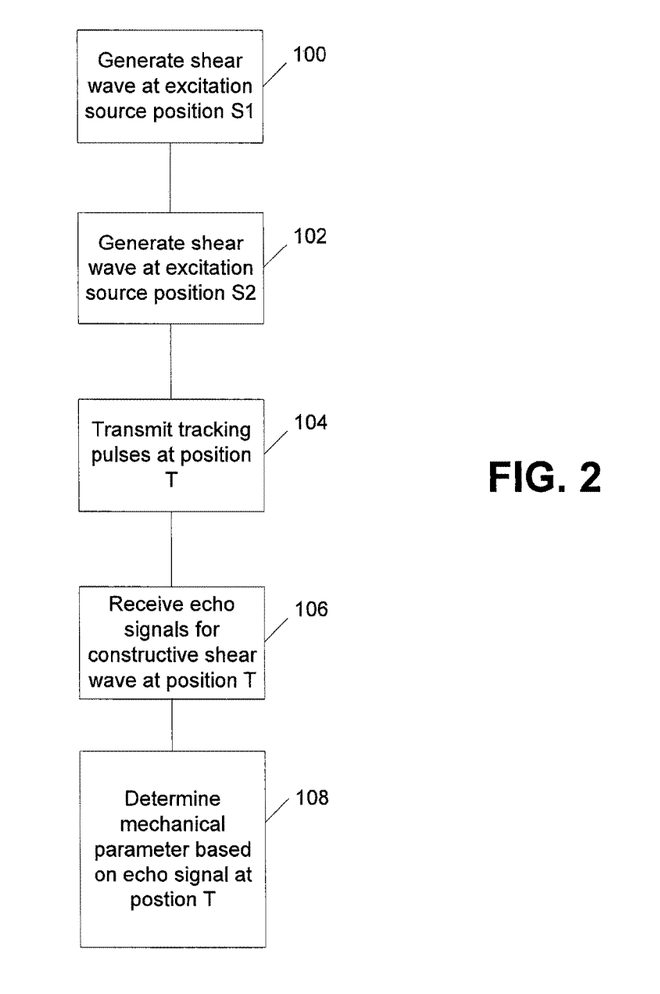
FIG. 2 is a flowchart illustrating operations according to some embodiments.

The shear wave generator 22 and the constructive shear wave analyzer 32 may determine a mechanical parameter for the target region 62 of the sample tissue 60 by generating and analyzing constructive shear waves. As shown in FIGS. 1 and 2, the shear wave generator 22 may generate a first shear wave in the target region 62 at a first excitation source position S1 (Block 100; FIG. 2) and a second shear wave in the target region 62 at a second excitation source position S2 (Block 102; FIG. 2). The controller 20 can control the array 40 to emit tracking pulses in the target region 62 at a tracking position T that is between the first and second source excitation positions S1, S2 (Block 104; FIG. 2). Corresponding echo signals for the tracking pulses at the tracking position T in the target region 62 are received by the array 40 (Block 106; FIG. 2). The constructive shear wave analyzer 32 determines at least one mechanical parameter of the target region 62 based on the echo signal at position T (Block 108; FIG. 2). For example, the mechanical parameter may be based on a time of a peak displacement of tissue, an inflection in a displacement slope of tissue displacement at the tracking position T and/or a relative or absolute displacement amplitude of a constructive shear wave displacement from the first and second shear waves. In this configuration, the constructive shear wave from the first and second shear waves may increase a signal to noise ratio and provide an improved ultrasound signal as compared to a single shear wave.

The shear waves may be generated simultaneously at Blocks 100 and 102, and the position T may be substantially equidistant from the positions S1, S2 so that the shear waves arrive at position T at approximately the same time in a tissue region with substantially homogeneous tissue stiffness. However, any suitable configuration of two or more constructive shear waves that have an arrival time at a common position may be used. For example, time-of-flight information may be used to select a timing of constructive shear wave arrival times at the position T and/or to select a spacing of the source excitation positions S1, S2 so that the equidistant spacing of the tracking position T from the source excitation positions S1, S2 and simultaneous excitation is not required to achieve a constructive or additive shear wave at the tracking position T.

Figure 3:
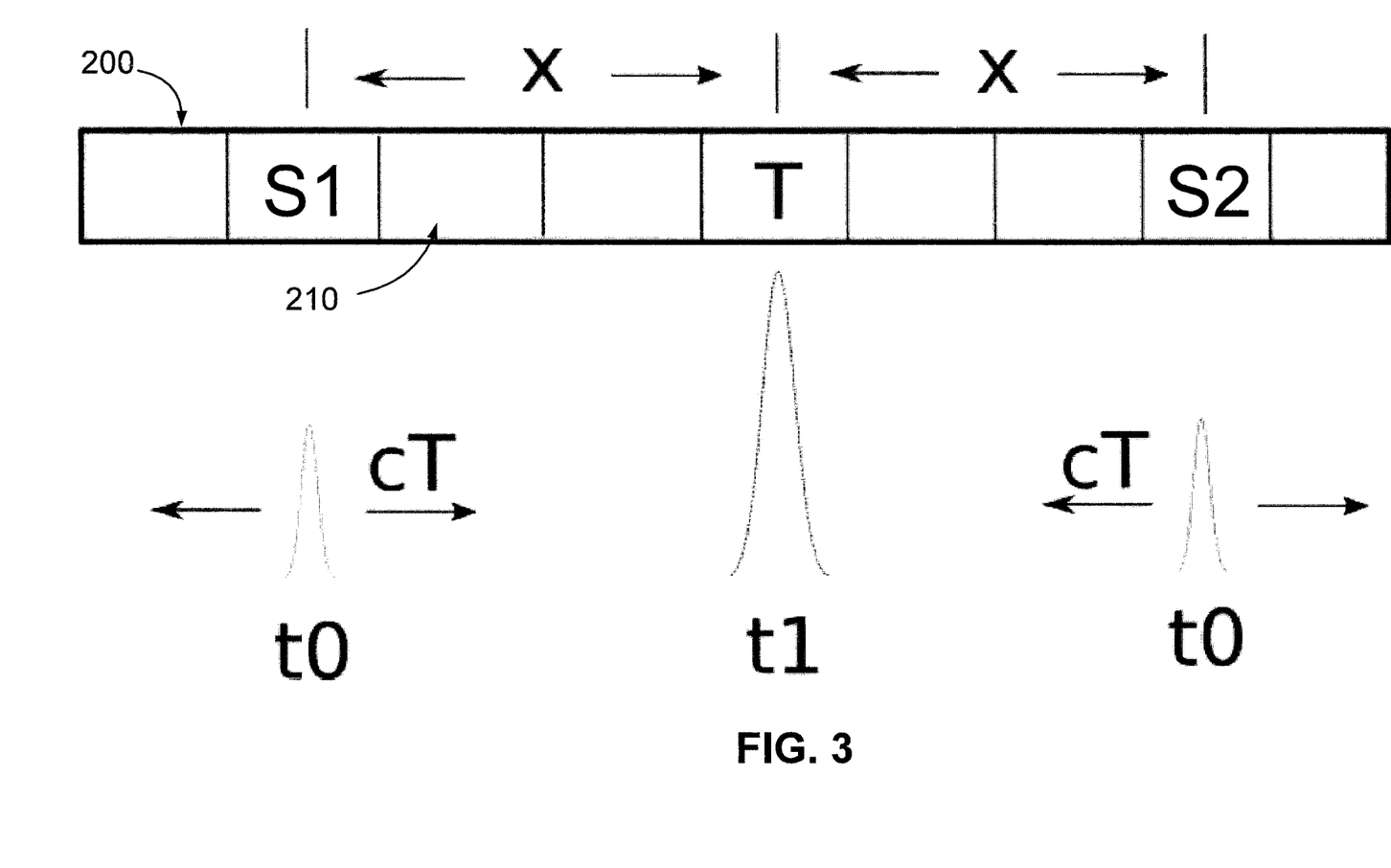
FIG. 3 is a linear ultrasound transducer array according to some embodiments.

FIG. 3 illustrates an ultrasound array 200 including a linear array of transducers 210, including ultrasound transducers corresponding to the first and second excitation positions S1, S2 and the tracking position T. The tracking position T may be substantially the same distance X from the first and second excitation positions S1, S2 such that the first and second shear waves arrive at the tracking position T at substantially a same arrival time so as to increase a tissue displacement at the tracking position T at the arrival time as compared to a displacement of the first shear wave (in an absence of the second shear wave) or the second shear wave (in an absence of the first shear wave). The first and second shear waves will generally have the same arrival time at the tracking position T if the tracking position T is substantially the same distance X from the first and second excitation positions S1, S2 if the tissue in the target region 62 of FIG. 1 has substantially uniform stiffness with a substantially constant shear wave speed cT between the source excitation positions S1, S2 and the tracking position T and/or the distance X is sufficiently small. For example, in some embodiments, the distance X is less than two shear wavelengths. The source of the shear waves at positions S1, S2 generates the first and second shear waves at a common time $t_0$ and each shear wave arrives at the tracking position T at an arrival time $t_1$. It should be understood that the configuration of FIG. 3 may be achieved using three ultrasound elements on an ultrasound array, such as the array 40 of FIG. 1, or by using discrete pistons at each source excitation position S1, S2 and tracking position T.

The excitation sources may be provided by any suitable configuration of multiple sources that are spaced-apart and/or timed such that the resulting shear waves constructively come together at the tracking location to augment the individual amplitudes of the shear waves taken individually. The tracking pulses may be used to determine at least one mechanical parameter of the target region 62, including a shear elasticity modulus, Young's modulus, storage modulus dynamic shear viscosity, shear wave velocity and mechanical impedance of the target region 62 using any suitable technique, including SWEI analysis techniques known to those of skill in the art.

Figure 4:
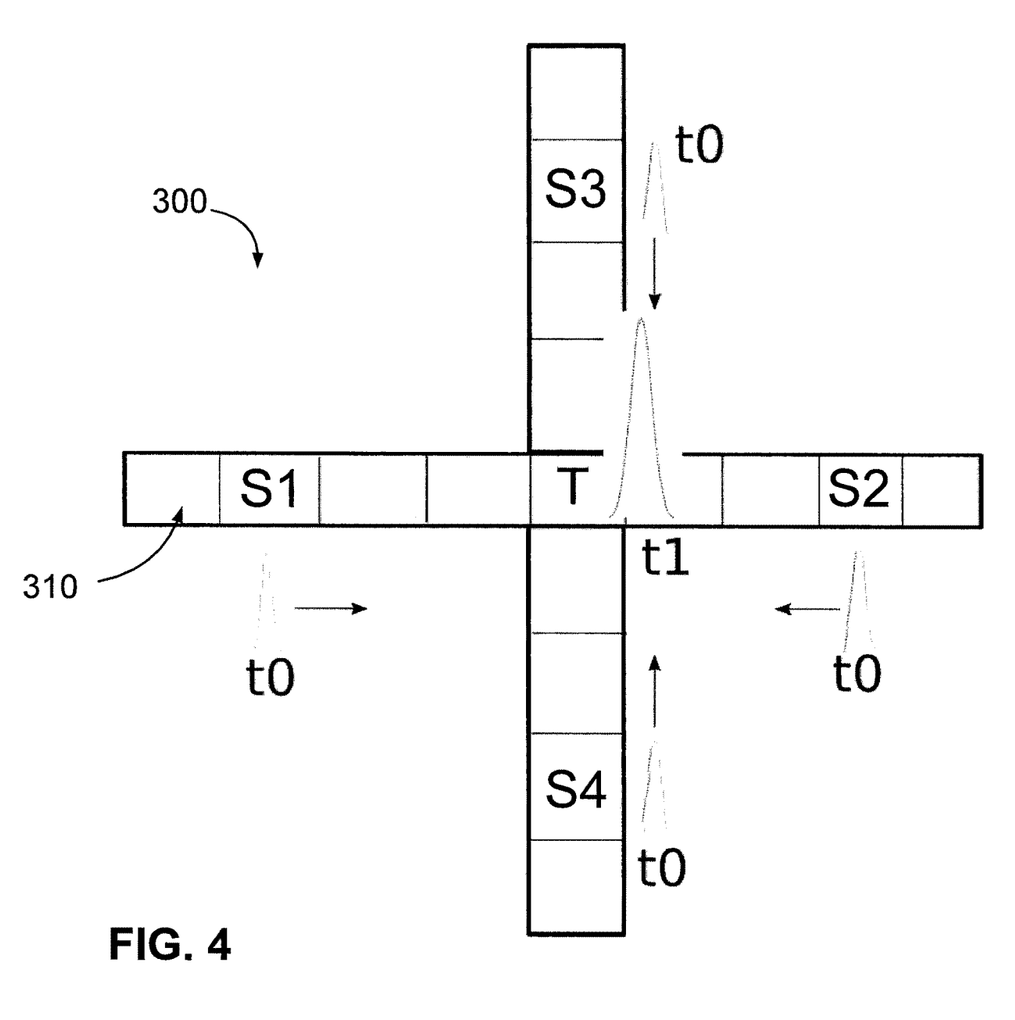
FIG. 4 is a two-dimensional ultrasound transducer array according to some embodiments.
Figure 5:
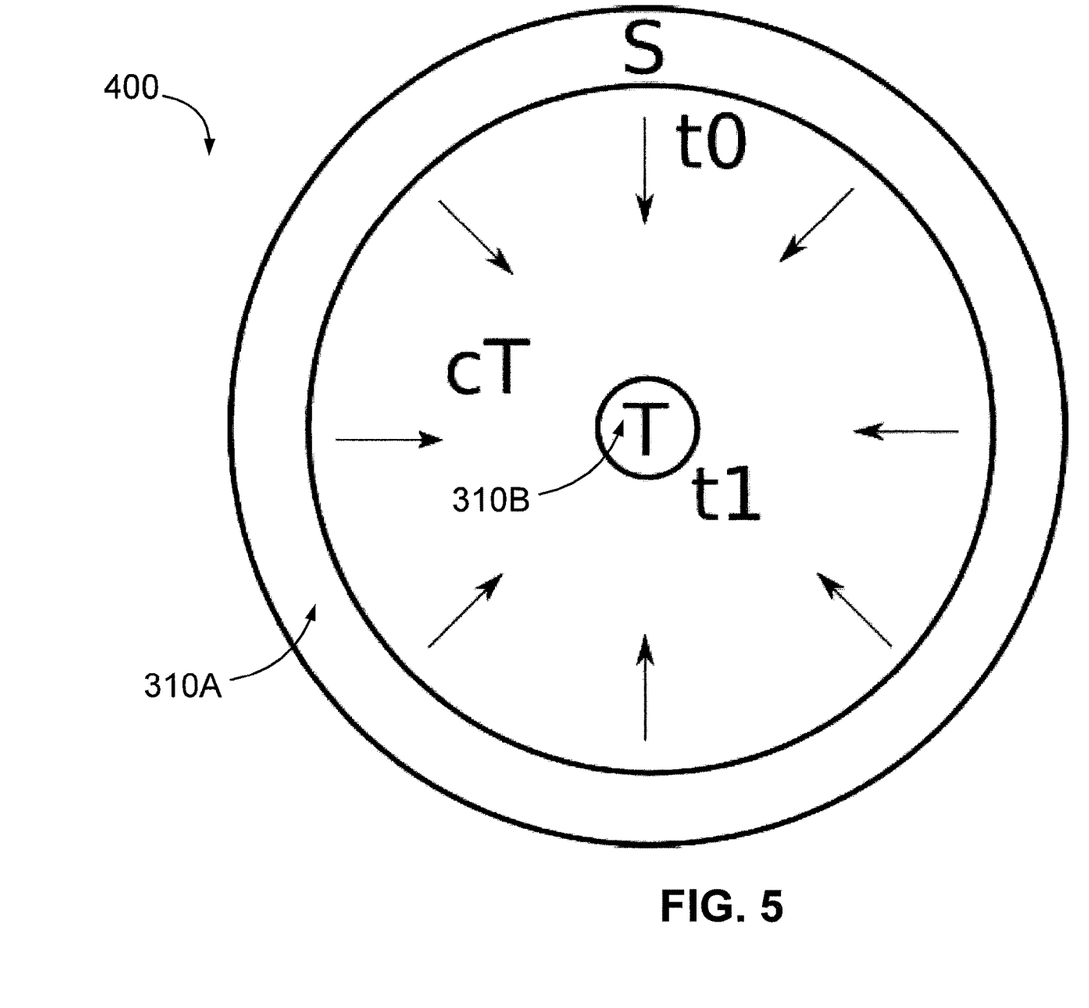
FIG. 5 is a ring-shaped ultrasound transducer array with a central tracking transducer according to some embodiments.

In addition, it should be understood that more than two excitation sources may be used, such as in a matrix (two-dimensional) array as illustrated in FIGS. 4 and 5. Moreover, the excitation sources may be provided by one- or two-dimensional ultrasound transducer arrays, a ring or two-dimensional matrix array that provides a "ring" of sources, and/or piston transducers that are physically separated from one another. Accordingly, it should be understood that the shear waves at the source excitation position S1, S2 may be generated with an ultrasound transducer and/or a mechanical vibrator. The excitation sources may transmit a displacement pulse sufficient to generate a shear wave in the region of interest.

For example, as shown in FIG. 4, a two-dimensional ultrasound array 300 of ultrasound transducer or piston elements 310, including transducers corresponding to shear wave excitation sources S1, S2, S3 and S4 and tracking position T, are shown in FIG. 4. As illustrated, the array 300 includes seventeen elements 210; however, any number of elements in rows/columns may be used. The tracking position T may be substantially the same distance from the positions S1, S2, S3 and S4 such that the shear waves arrive at the tracking position T at substantially a same arrival time so as to increase a tissue displacement at the tracking position T at the arrival time as compared to a displacement of each of the shear waves taken individually. The shear waves will generally have the same arrival time at the tracking position T if the tracking position T is substantially the same distance X from the excitation positions S1, S2, S3 and S4 if the tissue has substantially uniform stiffness with a substantially constant shear wave speed and the distance between the excitation positions S1, S2, S3 and S4 and the tracking position T is sufficiently small. The source of the shear waves at positions S1, S2, S3 and S4 generates four respective shear waves at a common time $t_0$ and each shear wave arrives at the tracking position T at a common arrival time $t_1$.

As shown in FIG. 5, the shear wave excitation may be generated by a continuous ring source ultrasound transducer 310A with a centrally located tracking transducer or piston 310B. A non-continuous ring could also be used with sources that are all substantially equidistant from the central tracking location of the piston 310B. The source of the shear waves at the ultrasound transducer 310A shear waves from the positions around the ring at a common time $t_0$ and the resulting shear waves arrive at the tracking position T at a common arrival time $t_1$. Accordingly, it should be understood that two or more shear waves may be generated by a substantially continuous ring-shaped transducer 310 to generate shear waves that originate at continuous locations around the ring-shaped transducer 310 and converge at the tracking position T.

The tracking signals may be detected and/or the shear waves may be generated repeated as described herein through a region of interest, for example, to generate an image. The tracking signals may be detected and/or the shear waves may be generated as described herein with an internally inserted ultrasound probe array or an externally applied ultrasound array. In some embodiments, the target region may be an in vivo human tissue sample; however, in vitro biomaterials, such as engineered tissues or hydrogels may be used.

The mechanical parameter(s) of the sample, such as shear elasticity modulus, Young's modulus, storage modulus dynamic shear viscosity, shear wave velocity and mechanical impedance, can be correlated to measurement of healthy/diseased tissue states, such as by using actual clinical data and known healthy/diseased tissue states. The clinical data can be based on other factors such as demographic information, e.g., age, gender and race, to correlate the measurement of the mechanical parameter(s) with a measurement of healthy/diseased tissue states in a particular demographic group.

In some embodiments, the mechanical parameter(s) of the sample can be monitored as a function of time by performing the shear wave analyzing techniques described herein on a sample repeatedly over a period of time. A healthy/diseased tissue state determination can be based on a change in the mechanical parameter(s) as a function of time. For example, the mechanical parameter(s) can be monitored over a period of minutes, hours, days, weeks, months or even years to determine the progression of the disease and/or the efficacy of treatment.

In some embodiments, the mechanical parameter(s) may be used to form an ultrasound image, such as a B-mode image or an ARFI image.

Figure 6A:
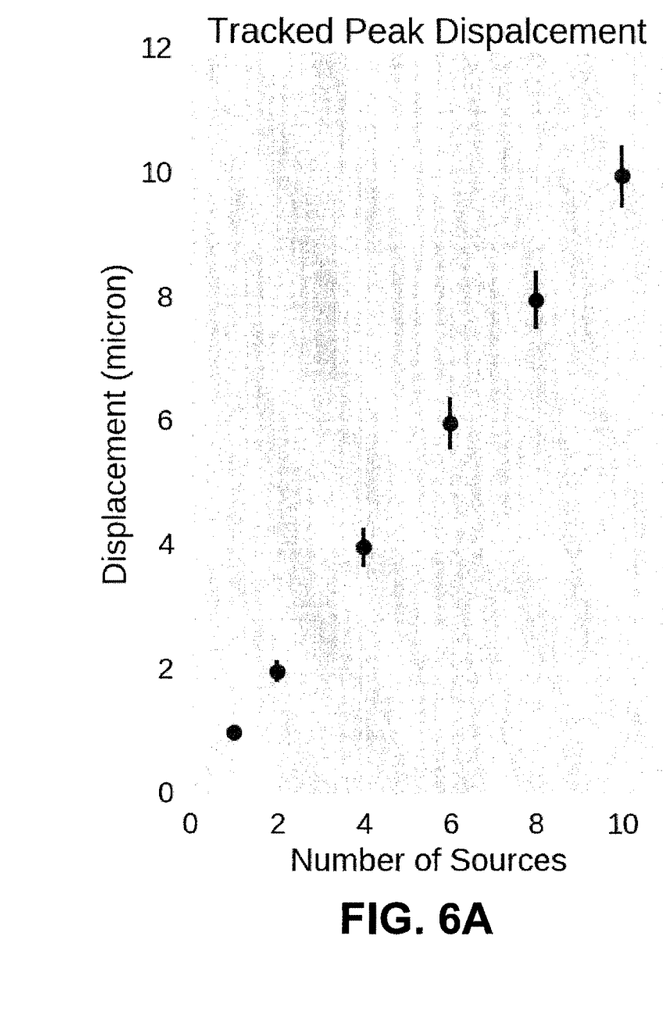
FIG. 6A is a plot of simulated data illustrating a displacement value as a function of the number of ultrasound excitation sources according to some embodiments.
Figure 6B:
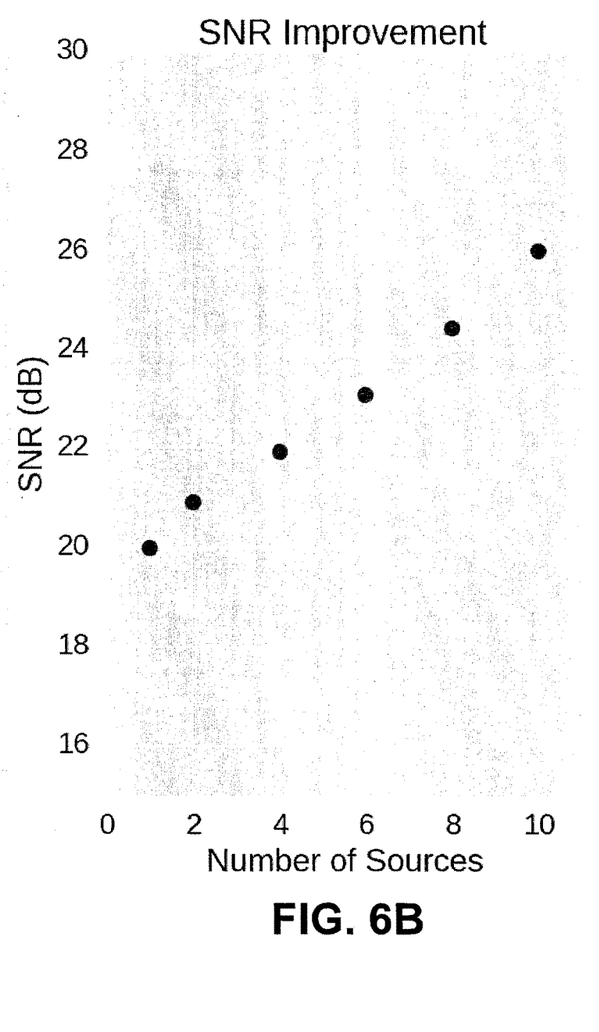
FIG. 6B is a plot of the simulated data of FIG. 6A illustrating a signal to noise ratio as a function of the number of ultrasound excitation sources according to some embodiments.

In some embodiments, improvements of the signal-to-noise ratios may be achieved. For example, as shown in FIGS. 6A-6B, representative simulated data of how displacement amplitude at the central tracking location (FIG. 6A) and the associated SNR (FIG. 6B) change as a function of number of equidistant sources. In this simulation, the sources were placed 5 mm from a central track location, and each source was approximated using an axisymmetric, Gaussian-distributed geometry that had a full width half maximum (FWHM) of 0.1 mm in the same spatial plane as the sources. The material was modeled as purely elastic, with a Young's modulus of 6 kPa and a Poisson's ratio of 0.495 (nearly incompressible). The acoustic radiation force for each source was applied for 50 us, and displacements were tracked at the central location at a 10 kHz rate for a total of 20 ms. The tracking focal configuration was simulated for that of a focused piston with a focal depth of 1.25 cm. As expected, both the displacement magnitude and the associated SNR increase with more sources. While 10 sources were feasible to simulate, the physical size of each source is expected to impose a constraint on how many sources are used, and how closely spaced they can exist. The number of sources, their spacing, and their focal configurations are all parameters that can be optimized for different clinical applications.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for determining at least one mechanical parameter for a sample having a target region using constructive shear wave displacement, the method comprising:
generating three or more shear waves comprising at least a first shear wave in the target region at a first excitation position and a second shear wave in the target region at a second excitation position and a third shear wave in the target region at a third excitation position, the first, second and third excitation positions defining a common plane comprising the first and second excitation positions so that the first and second shear waves propagate along the common plane to constructively interfere at a midpoint on the common plane between the first, second and third excitation positions;
transmitting tracking pulses in the target region at a tracking position, the tracking position comprising the midpoint on the common plane between the first, second and third excitation positions to track constructive interference between the first, second and third shear waves at the midpoint, wherein the first, second and third excitation positions are equidistant from the tracking position;

receiving corresponding echo signals for the tracking pulses at the tracking position in the target region; and determining at least one mechanical parameter of the target region based on at least one parameter of a constructive shear wave displacement from the first, second and third shear waves simultaneously displacing tissue at the tracking position.

2. The method of claim 1, wherein the at least one parameter of the constructive shear wave displacement comprises at least one of a time of a peak displacement of tissue, an inflection in a displacement slope of tissue displacement at the tracking position and a relative or absolute displacement amplitude of the constructive shear wave displacement from the first and second shear waves.

3. The method of claim 1, wherein the first and second shear waves are generated simultaneously with respective first and second excitation pulses, and the tracking position is equidistant from the first and second excitation positions such that the first and second shear waves arrive at the tracking position to create the constructive shear wave displacement at a same arrival time that increases a tissue displacement at the tracking position at the arrival time as compared to a displacement of the first shear wave in an absence of the second shear wave or a displacement of the second shear wave in an absence of the first shear wave.

4. The method of claim 1, wherein the step of determining the at least one mechanical parameter of the target region is based on analyzing echo signals at the tracking position to determine a time-of-flight difference and/or velocity estimate of the shear wave.

5. The method of claim 1, wherein the first and second excitation positions correspond to positions of ultrasound array elements that transmit an excitation pulse sufficient to generate a shear wave in the target region.

6. The method of claim 1, wherein the tracking position corresponds to a position of an ultrasound array element that transmits the tracking pulses and receives the echo signals.

7. The method of claim 1, wherein the at least one mechanical parameter includes at least one of shear elasticity modulus, Young's modulus, storage modulus dynamic shear viscosity, shear wave velocity and mechanical impedance of the target region.

8. The method of claim 1, wherein the target region comprises an in vivo human tissue sample.

9. The method of claim 1, wherein the target region comprises in vitro biomaterials.

10. The method of claim 1, wherein the echo signals of the sample are detected with an internally inserted ultrasound probe array.

11. The method of claim 1, wherein the echo signals of the sample are detected with an externally applied ultrasound array.

12. The method of claim 1, wherein the first, second and third shear waves are generated with an applied shear wave source comprising an ultrasound transducer and/or mechanical vibrator.

13. The method of claim 1, wherein the first, second and third shear waves comprise a displacement that is orthogonal to a propagation direction of the first, second and third shear waves.

14. The method of claim 1, wherein the first and second shear waves are generated simultaneously at the first and second excitation positions and arrive at the midpoint at a same time.

15. A computer program product for determining at least one mechanical parameter for a sample having a target region using constructive shear wave displacement, the computer program product comprising a non-transient computer readable medium having computer readable program code embodied therein and configured for execution by a processor or a controller, the computer readable program code comprising one or more modules comprising:

computer readable program code configured to generate three or more shear waves comprising at least a first shear wave in the target region at a first excitation position, a second shear wave in the target region at a second excitation position, and a third shear wave in the target region at a third excitation position, the first, second and third excitation positions defining a common plane comprising the first, second and third excitation positions so that the first, second and third shear waves propagate along the common plane to constructively interfere at a midpoint on the common plane between the first, second and third excitation positions;

computer readable program code configured to transmit tracking pulses in the target region at a tracking position, the tracking position comprising the midpoint on the common plane between the first, second and third excitation positions to track constructive interference between the first, second and third shear waves at the midpoint, wherein the first, second and third excitation positions are equidistant from the tracking position;

computer readable program code configured to receive corresponding echo signals for the tracking pulses at the tracking position in the target region; and computer readable program code configured to determine the at least one mechanical parameter of the target region based on at least one parameter of a constructive shear wave displacement from the first, second and third shear waves simultaneously displacing tissue at the tracking position.

16. The computer program product of claim 15, wherein the at least one parameter of the constructive shear wave displacement comprises at least one of a time of a peak displacement of tissue, an inflection in a displacement slope of tissue displacement at the tracking position and a relative or absolute displacement amplitude of the constructive shear wave displacement from the first and second shear waves.

17. The computer program product of claim 16, wherein the tracking position is equidistant from the first and second excitation positions such that the first and second shear waves arrive at the tracking position to create the constructive shear wave displacement at a same arrival time that increases a tissue displacement at the tracking position at the arrival time as compared to a displacement of the first shear wave in an absence of the second shear wave or a displacement of the second shear wave in an absence of the first shear wave.

18. A ultrasound system for determining at least one mechanical parameter for a sample having a target region using constructive shear wave displacement, the system comprising:

an ultrasound transducer array;

a controller configured to control the ultrasound transducer array, the controller comprising:

a shear wave generator configured to generate three or more shear waves comprising at least a first shear wave in the target region at a first excitation position, a second shear wave in the target region at a second excitation position, and a third shear wave in the target region at a third excitation position, the first, second and third excitation positions defining a common plane comprising the first, second and third excitation positions so that the first, second and third shear waves propagate along the common plane to constructively interfere at a midpoint on the common plane between the first, second and third excitation positions;

a signal analyzer configured to transmit tracking pulses in the target region at a tracking position and to receive corresponding echo signals for the tracking pulses at the tracking position in the target region, the tracking position comprising the midpoint on the common plane between the first, second and third excitation positions to track constructive interference between the first, second and third shear waves at the midpoint, wherein the first, second and third excitation positions are equidistant from the tracking position, and to determine the at least one mechanical parameter of the target region based on at least one parameter of a constructive shear wave displacement from the first, second and third shear waves simultaneously displacing tissue at the tracking position.

19. The ultrasound system of claim 18, wherein the at least one parameter of the constructive shear wave displacement comprises at least one of a time of a peak displacement of tissue, an inflection in a displacement slope of tissue displacement at the tracking position and a relative or absolute displacement amplitude of the constructive shear wave displacement from the first and second shear waves.

20. The ultrasound system of claim 18, wherein the tracking position is equidistant from the first and second excitation positions such that the first and second shear waves arrive at the tracking position to create the constructive shear wave displacement at a same arrival time that increases a tissue displacement at the tracking position at the arrival time as compared to a displacement of the first shear wave in an absence of the second shear wave or a displacement of the second shear wave in an absence of the first shear wave.

* * * * *